No. 726,898. PATENTED MAY 5, 1903.
W. W. FRY.
DEVICE FOR TEACHING PENMANSHIP.
APPLICATION FILED SEPT. 13, 1902.
NO MODEL.
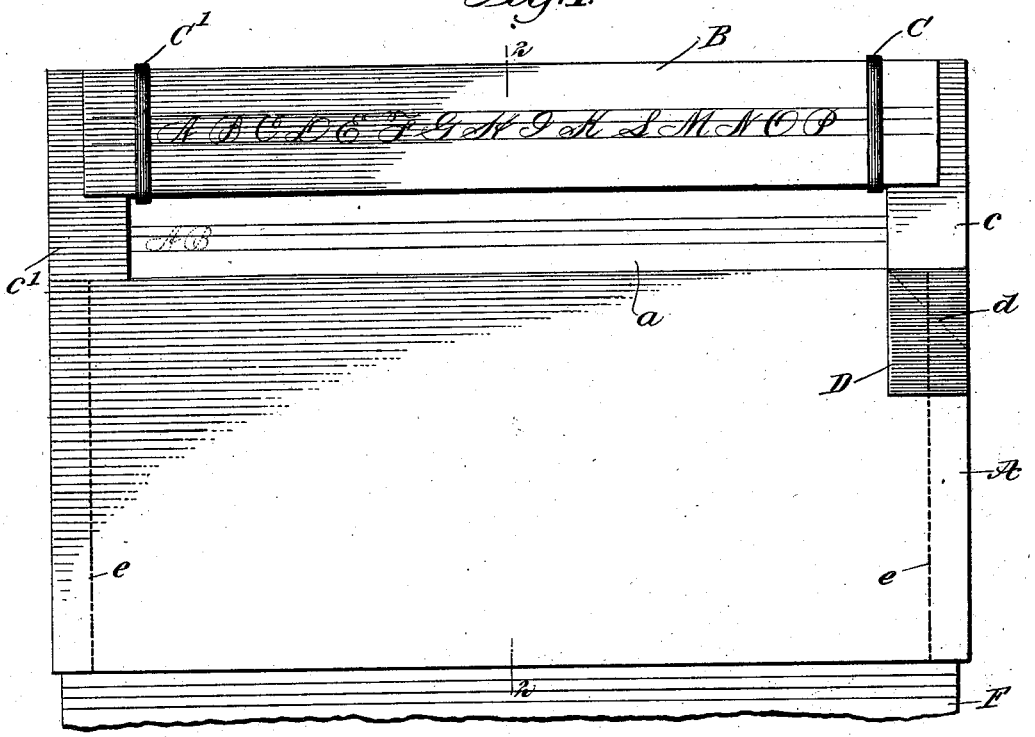
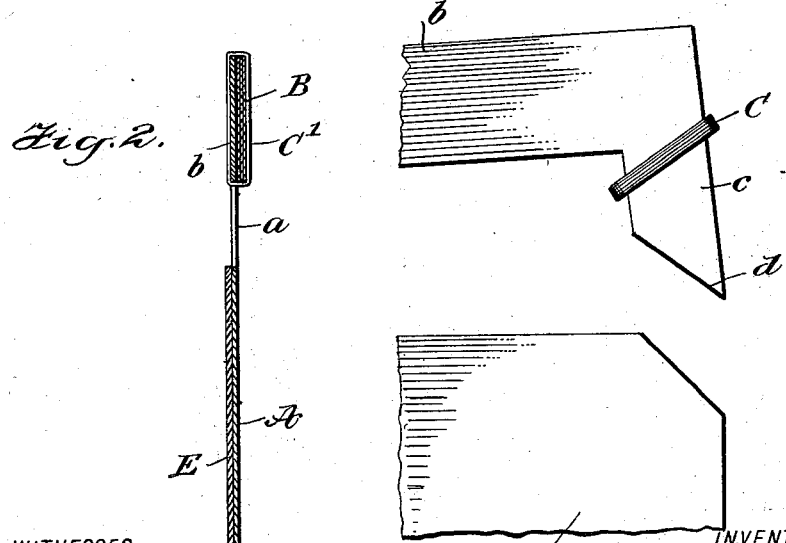
WITNESSES:
INVENTOR
William W. Fry
BY
ATTORNEYS.

No. 726,898. Patented May 5, 1903.

UNITED STATES PATENT OFFICE.

WILLIAM W. FRY, OF PHILADELPHIA, PENNSYLVANIA.

DEVICE FOR TEACHING PENMANSHIP.

SPECIFICATION forming part of Letters Patent No. 726,898, dated May 5, 1903.

Application filed September 13, 1902. Serial No. 123,298. (No model.)

*To all whom it may concern:*

Be it known that I, WILLIAM W. FRY, a citizen of the United States, and a resident of Philadelphia, in the county of Philadelphia and State of Pennsylvania, have invented new and useful Improvements in Devices for Teaching Penmanship, of which the following is a full, clear, and exact description.

My invention relates to improvements in devices for teaching penmanship of that class in which a slotted sheet or backing is associated with a guide-copy; and the object that I have in view is the provision of an improved device in which a series of guide-copies may be interchangeably placed in position before the pupil and in which each copy is securely held in place and in a flat condition by devices that are adapted to permit the easy and quick introduction and removal of the copy, the entire device being simple in construction and cheap of manufacture.

With these ends in view the invention consists in a device for teaching penmanship embodying novel features of construction, which will be hereinafter fully described and claimed.

Reference is to be had to the accompanying drawings, forming a part of this specification, in which similar characters of reference indicate corresponding parts in all the figures.

Figure 1 is a plan view of my improved device for teaching penmanship. Fig. 2 is a cross-section thereof on the line 2 2 of Fig. 1, and Fig. 3 is a fragmentary detail view illustrating the condition of the sheet or backing at one stage of its manufacture.

In carrying my invention into practice I employ a sheet or backing A, the same being of any suitable size and made of a single piece of any kind of material adapted for the purposes of the invention—such as cardboard, celluloid, sheet metal, or any other material. This sheet is provided near its top edge with a longitudinal slot $a$, thereby forming a top bar $b$ and the side bars $c\ c'$.

The top bar $b$ of the sheet or backing is made in one piece with the side bars $c\ c'$ and the sheet proper, and this top bar is adapted to receive the interchangeable copies B, any suitable number of which may be provided with the sheet or backing. These copies B are adapted to be laid in a flat condition upon the top bar $b$ and upon one another, although a single copy may be employed, if desired. The copies may contain specimens of penmanship or any suitable matter to serve as a guide to the pupil in acquiring the art of writing.

C C' designate elastic bands arranged to straddle the top bar $b$ and to embrace the copy or copies B for the purpose of holding the latter securely in a proper position above the slot $a$. These elastic bands may be of rubber or any other suitable material, and they are adapted to be stretched in the operation of removing and introducing the copies, said bands being adapted by their inherent elasticity to contract around the top bar and hold the copy B in place by frictional engagement therewith.

One of the problems which presented itself for solution in the practical manufacture of my improved penmanship-guide was the difficulty of placing the long bands C C' around the top bar of the sheet or backing. I have solved this problem by slitting or cutting the sheet in a diagonal line, as at $d$. (Indicated by dotted lines in Fig. 1 and by full lines in Fig. 3.) This line of severance extends in an inclined direction from the angle or corner formed by the juncture of the lower edge of the slot $a$ and the inner edge of the side bar $c$, said line of division extending across one corner of the sheet proper, A. The side bars $c$ and the sheet A are united or joined by the employment of a sealing-strip D, the latter arranged to span the line of severance $d$ between the sheet A and the bar $c$. This sealing-strip is as wide as the bar $c$, and it is united to the bar $c$ and the sheet A by cement or any suitable adhesive. The sealing-strip is shown by Fig. 1 as lying on the top exposed face of the sheet A; but it is evident that this strip may be provided on the reversed face of the sheet or it may be used on both faces of the sheet.

E designates a thickness of the blotting-paper which is applied to the reversed face of the sheet A and is arranged to extend from the lower edge of the slot $a$ to the lower edge of the sheet A. The particular size of the blotting-sheet is not material, and said blotting-sheet may be attached to the sheet A by any suitable means—such, for example, as the rows of stitching $e$.

In the manufacture of my improved device the sheet A is stamped or made from a single piece of material with the slot $a$ and the cut or slit $d$. The bar $b$ may be bent or deflected to the position shown by Fig. 3 in order to form a wide space between the inclined corner of the sheet A and the inclined end of the side bar $c$. This allows the elastic bands C C' to be easily placed or slipped over the bar $c$ and along the bar $b$ to their proper positions.

The bar $b$ may be bent back into place, so as to close the gap or throat at the line $d$, and finally the sealing-strip D is cemented in place over the cut $d$. Any suitable number of copies may be slipped within the bands C C', so as to rest on the top bar $b$.

In using the device the slotted sheet or backing A is placed over a sheet of paper, as F, and the pupil writes through the slot $a$ upon this paper sheet F. The copy B is directly above the line on which the pupil is engaged in writing, and the pupil is thus able to closely follow the copy. The sheet A is shoved in an upward direction over the paper F from time to time, and the freshly-written line on the sheet F can be easily blotted by pressing the blotting-sheet E upon the writing.

Having thus described my invention, I claim as new and desire to secure by Letters Patent—

1. A device for teaching penmanship, comprising a sheet provided with a slot and with a line of severance, suitable holding-bands fitted to one part of the sheet, and a sealing means uniting the divided or slitted part of the sheet.

2. A device for teaching penmanship, comprising a sheet provided with a slot and cut in a diagonal direction across one corner of said sheet, and a side bar thereof, a sealing-strip united to the sheet and the said bar and extending across the line of severance, and suitable copy-holding bands fitted to the upper part of the slotted sheet.

3. A device for teaching penmanship, comprising a slotted sheet having a top bar and side bars, one of said side bars being divided from the corner of the sheet by a diagonal line of severance, a sealing-strip united to the sheet and one side bar thereof and extending across the line of severance, suitable bands fitted to the top bar of the sheet, and a blotting-sheet united to the slotted sheet below the slot therein.

In testimony whereof I have signed my name to this specification in the presence of two subscribing witnesses.

WILLIAM W. FRY.

Witnesses:
G. PRENTICE CARSON,
J. SCOTT FRITCH.